April 8, 1969 A. N. MONTGOMERY 3,437,767

PROGRAM SYSTEM

Filed June 20, 1966 Sheet 1 of 5

Inventor:
Arvid N. Montgomery
BY ROBERT L. KAHN ATTY

Inventor:
Arvid N. Montgomery
BY Robert L. Kahn Atty

April 8, 1969 A. N. MONTGOMERY 3,437,767

PROGRAM SYSTEM

Filed June 20, 1966 Sheet 3 of 5

Inventor:
Arvid N. Montgomery
BY ROBERT L. KAHN ATTY

Inventor:
Arvid N. Montgomery
BY ROBERT L. KAHN ATTY.

Inventor:
Arvid N. Montgomery
By ROBERT L. KAHN ATTY 3,437,767

PROGRAM SYSTEM

Arvid N. Montgomery, Owensville, Ind., assignor to Du Kane Corporation, St. Charles, Ill., a corporation of Delaware Continuation-in-part of application Ser. No. 259,083, Feb. 18, 1963. This application June 20, 1966, Ser. No. 558,894

Int. Cl. H01h 7/08, 43/10

U.S. Cl. 200—38 13 Claims

ABSTRACT OF THE DISCLOSURE

A master clock system for programming various electrical devices utilizes an endless belt of a plastic having limited elasticity. This belt has parallel regularly spaced control track apertures each one of which may accommodate a control pin. The belt is driven at horological speed by an electric synchronous motor under normal conditions and by an alternate means (as a conventional clock drive) in case of power failure. Each control track has a track follower finger means for actuating electric switch means, such follower cooperating with belt pins only during normal conditions when electric power is available. In the absence of power, the track follower finger means is clear of the belt tracks. A calendar means disables the track finger follower means for certain idle periods as Saturdays or Sundays, as an example. The track follower finger means is adapted to utilize available electric switch means and has lost motion finger mounting arrangements providing a sensitive and simple system. Fast and slow cams provide accurate timing control for belt pin control and for calendar drum control.

This is a continuation-in-part of my application Ser. No. 259,083 filed Feb. 18, 1963, now abandoned.

This invention relates to a program system and is particularly concerned with a program belt system having one or more control tracks for horological or sequential operation of electric switches. A system embodying the present invention is adapted to operate switch gear for each control track generally in accordance with a predetermined but easily changeable schedule. The schedule of operation is determined by number and location of pins removably carried by a program belt, said pins and belt being so constructed and cooperating in a manner to facilitate changing the number and location of pins on the belt.

In program belt systems wherein time resolution of the order of a minute over a total time range of an entire day is necessary, the physical dimensions of a program belt, particularly the length thereof, can be a serious problem. As an example, in schools, control of equipment such as clocks, bells, lights, etc. involves a time control schedule up to 24 hours. In such a schedule, control over every minute of the entire day may be necessary. Over a school day, timing control must be accurate not only with regard to the particular time during which a control function is exercised but with respect to the duration of such function. Thus, in school systems, such equipment must be operated at precise times for precise periods of time and in accordance with a predetermined schedule. Due to the large amount of equipment and variety of schedules, there is a premium upon the number of control tracks available on a program belt. It is therefore important that a control track be functionally independent of every other control track.

An important feature of the present invention resides in the program belt and pin structures whereby a program belt and pins functioning as an information storage means has long life, is easily manufactured and installed, is dimensionally stable, is easily handled, is light but strong, and is in a form where the information carried on the belt is readily recognized.

In addition to a program belt for cyclic scheduling, it is desirable to provide an over-riding control which will suspend or disable the program belt schedule or control action for desired periods of time. Thus, for school systems, as an example, program belt control over schedules is unnecessary for certain hours at night, on Saturdays and/or Sundays. However, in a program system where time resolution of a minute over a day time range is desired, it will be necessary to provide the over-riding control, generally referred to as calendar control, with equal time resolution for the onset and expiration of such calendar control. Thus, if from 6:00 a.m. Monday through 6:00 p.m. Friday (or midnight Friday) program belt schedule control is desired for every minute of time, (with or without time out for night hours), any lack of precision as to the time when calendar over-ride begins and ends will vitiate any excellent time resolution characteristic which may be built into the program belt system. To obtain such precision in conventional timing systems may impose undesirably fine tolerances or large dimensions on control cams or other elements. The invention provides means for obtaining precise timing action for calendar control with no more precision than is normal in the clock industry.

A program control belt in the new system may be operated as in schools where the time of day is a continuous parameter. In such systems, the program schedule must be tied accurately to clock time under all conditions except prolonged emergencies. In such cases, clock re-setting may be necessary. There are, however, many operations such as control of a sequence of manufacturing or chemical operations wherein absolute time keeping is not important except with relation to some arbitrary starting time. As an example, many manufacturing operations involve sequences of steps which must occur in timed relation after one or more particular steps have been taken. Thus, some cycles of operation starting at any time of the day or night may require sequential steps to be taken in a predetermined pattern of time once the cycle has been started. Other cycles may involve sequences of steps wherein one particular step may require a particular time and the following step may be initiated thereafter.

It can be readily appreciated that a program system having general application to schools, hotels, industrial operations, traffic control, etc., must have substantial flexibility in regard to program patterns without loss of time resolution while providing extended time scheduling.

The program system embodying the present invention requires some electric power to operate the system as distinguished from the loads controlled by the program system. The new system relies upon conventional alternating current power sources for both power and time keeping. The electric power required for operating the new program system, apart from timekeeping, is substantially greater than the electric power required for operating a clock whose only function is horological and not control a multiplicity of switch gear. In the event of a power failure or outage, the new system embodying the present invention, insofar as continuous time keeping is important as in school systems, provides for auxiliary maintainence of timekeeping function and program belt movement without program control over switch gear which, in case of a power failure, would be futile. In order to maintain the accuracy of timekeeping, as distinguished from program control, the new system embodying the present invention has means for removing the switch control load during electric power outage. This expedient maintains a fixed horological relationship between the program belt and the clock part of the system. During most power outages, the new system will not get out of time. As soon as power returns, the program system continues as though nothing had happened. It is understood that the auxiliary clock operating means, during power outage, may not be necessary in many instances.

In a program control system generally where a record medium such as, for example, a record belt, is provided and where actuating fingers or other equivalent actuating means are present, the load on the record medium will include electric switches. Instead of electric switches, it may be desirable to use some other device such as a valve or throttle. In any event, a part of the load imposed upon the record member may advantageously be a device which can be obtained as an article of commerce and used without substantial change. Thus, as a specific example, a program system having a program record medium can advantageously use small switches, such as microswitches. Such switches generally have a sealed mechanism and require a small force at a small amplitude for operation. Where a number of these switches are to be used in a program system, it is important that the program system as such be adaptable to accommodate such switches.

It is well known that within limits, such commercially available switches may have slight differences in operating force, operating amplitude, and range of movement. Accordingly, it is desirable that the system as a whole be able to adjust for tolerances in such switch articles. A feature of the present invention resides in the leverage system permitting accommodation of conventional switches or other devices to be controlled. A further feature resides in the ability to accommodate a substantial number of such devices without requiring wide control tracks on a record medium having a number of control tracks.

Referring now to the drawings.

Figures 4, 5, 5A, 5B, 6:
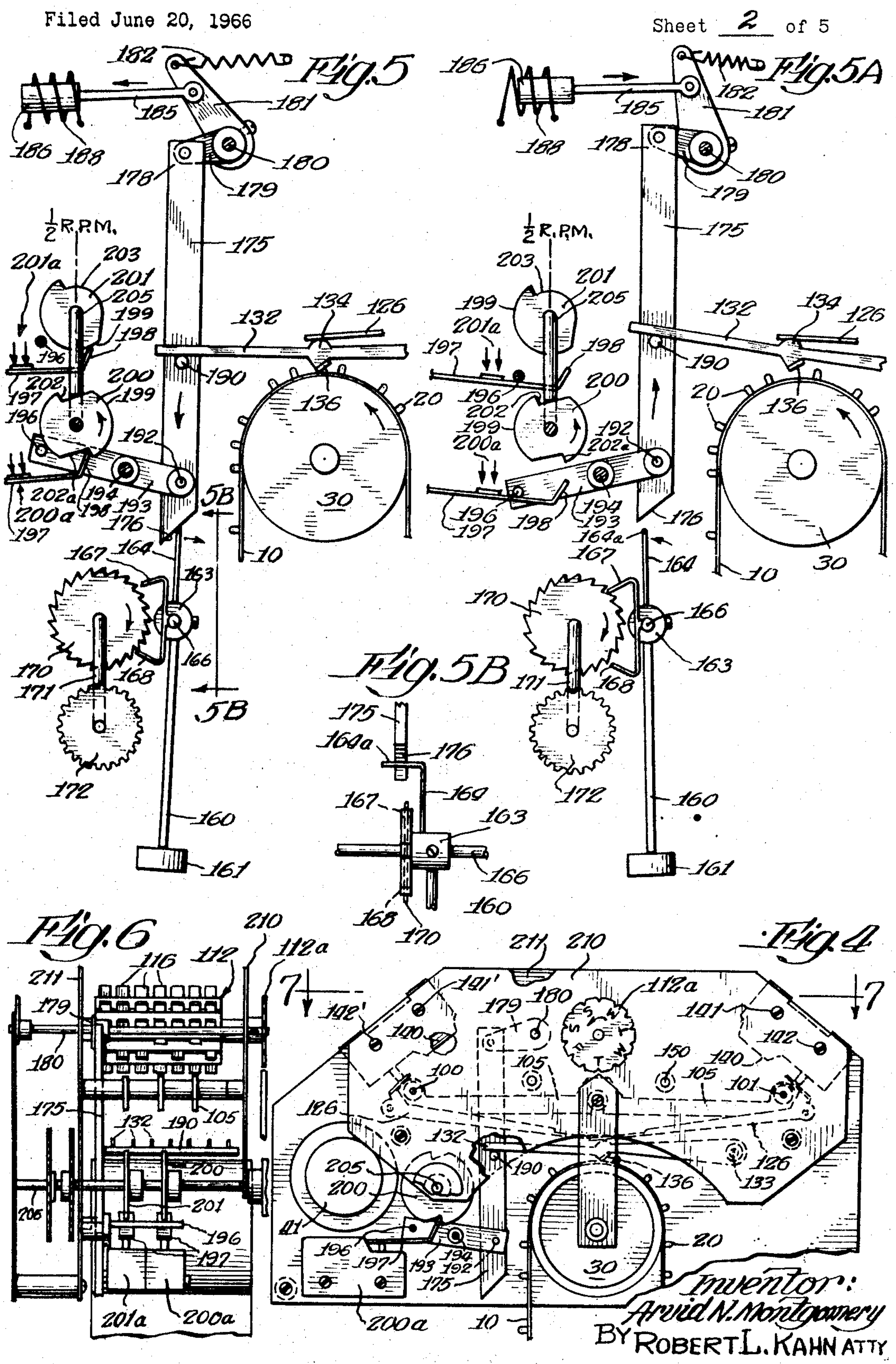
FIG. 4 is an elevation from the rear of most of the mechanism embodying the present invention, the pendulum being omitted to save space.

FIGS. 5 and 5A show elevations of the belt tracking unloading and pendulum locking means, FIG. 5 showing the parts in normal position with a live power source and the pendulum locked against oscillation with the belt tracking unloading means inoperative; and FIG. 5A showing the same with a dead power line and the pendulum unlocked and the belt tracking means unloaded; FIG. 5B showing a detail on line 5B—5B of FIG. 5.

FIG. 6 is a side elevation of the mechanism illustrated in FIG. 4, with certain parts removed for clarity.

Figures 7, 8:
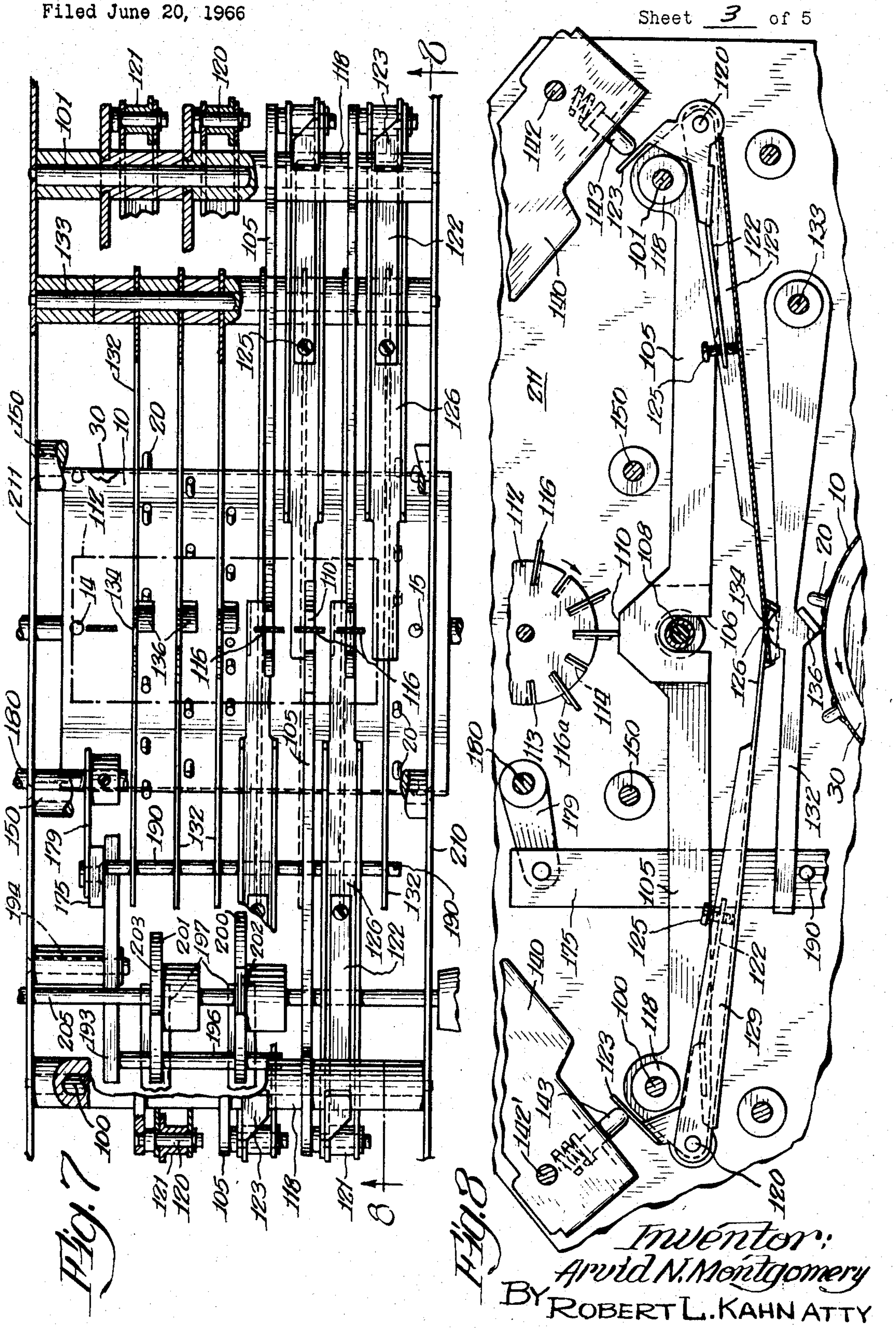

FIG. 7 is a top view along line 7—7 of FIG. 4.

FIG. 8 is an elevation along line 8—8 of FIG. 7, certain parts being omitted for clarity.

Figures 9, 9A:
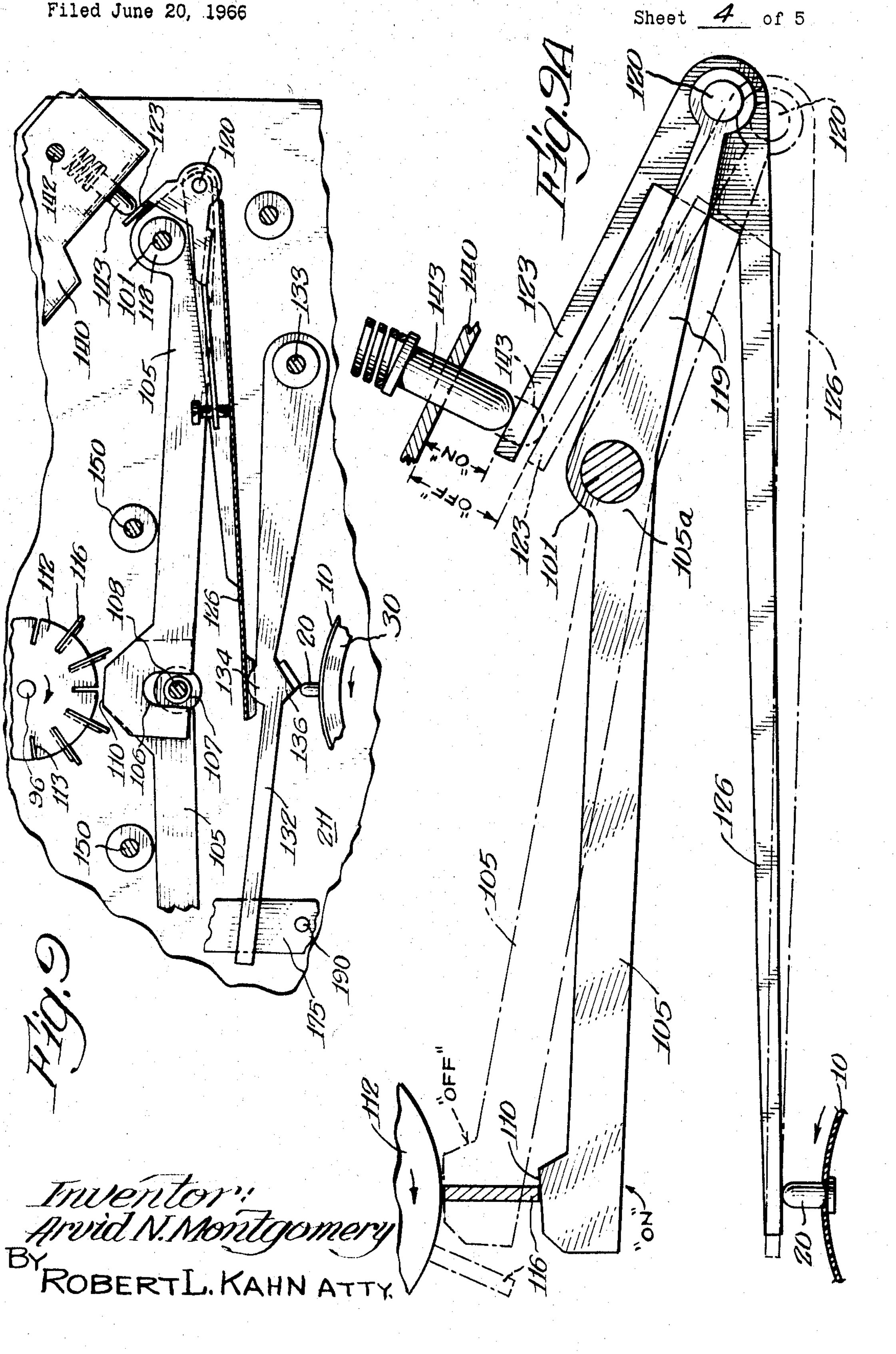

FIG. 9 is an enlarged elevation of a single lever group assembly for program belt tracking and calendar drum over-ride.

FIG. 9A is a view of a simplified form of lever group of FIG. 9, permitting a long dwell on a program pin, the motion range of parts being illustrated in exaggerated form for explanatory purposes.

Figures 10, 11, 12:
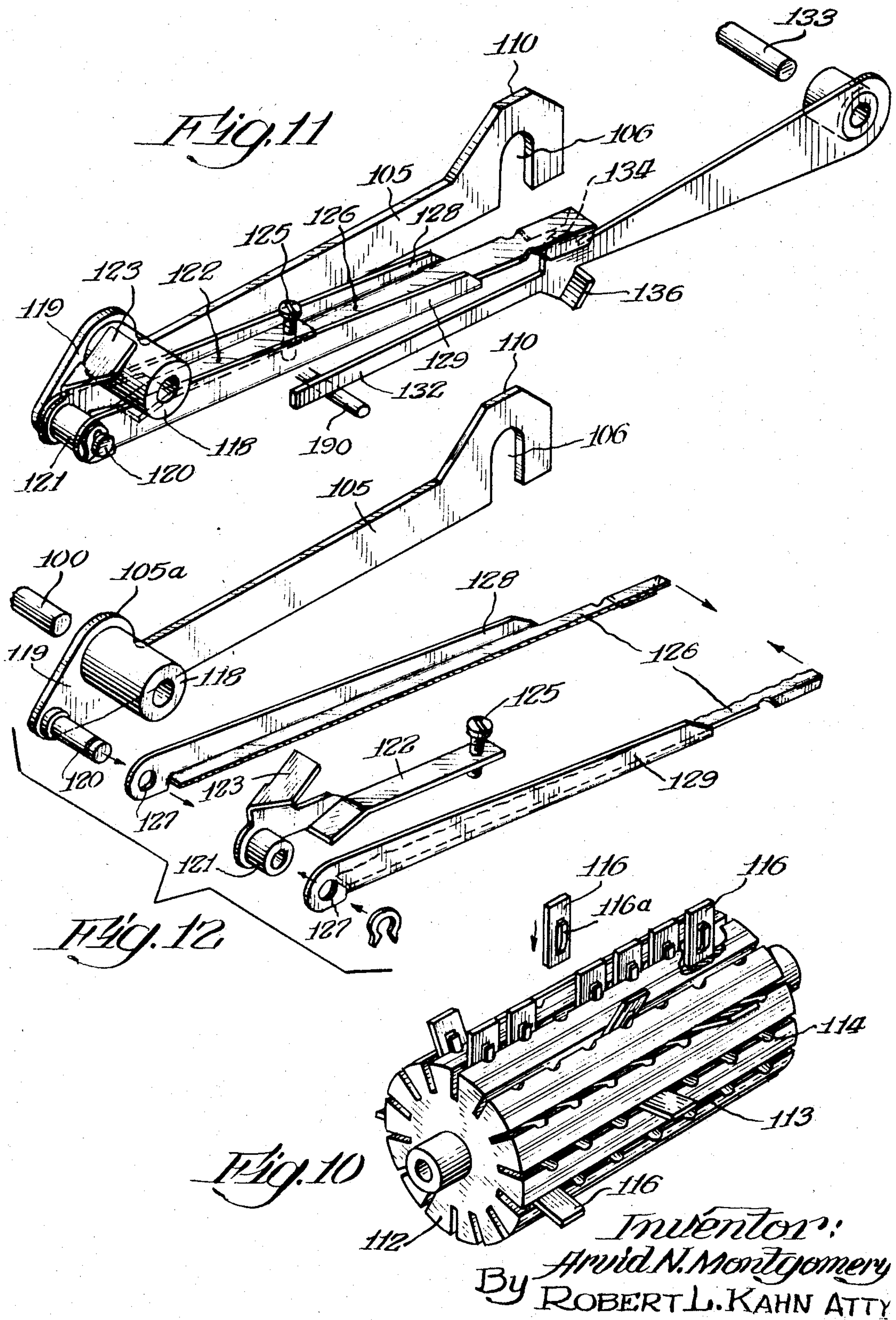

FIG. 10 is a perspective view of a calendar drum and tabs for use therewith.

FIG. 11 is a perspective view of the parts of a lever group for tracking a program belt.

FIG. 12 is an exploded perspective view of parts in a lever group minus the actual belt tracking lever.

Referring now to the system generally, program belt 10 is preferably endless and of thin plastic material. For long life and maximum utility, the physical properties hereinafter set forth are essential. Belt 10 has at least one, and preferably a number of parallel control tracks 11, each having spaced apertures 12. Track length corresponds to time. For maximum scheduling control potential, each track is provided with a closely spaced series of apertures 12. A practical separation along a track between centers of adjacent apertures 12 is substantially ⅛″. A spacing which is substantially less than the above imposes practical difficulties in regard to belt pins to be described and mechanism responsive to and controlled by the program belt. A greater separation along a track between adjacent belt apertures increases the overall belt length and, for long time schedules, may increase belt length to an unwieldy size. For a 24 hour belt having one minute of time between adjacent apertures along a track, the length will be fifteen feet.

It is understood that the above dimensions are merely exemplary and that the invention is not limited thereto. The belt must be seamed to avoid a double thickness at any usable track aperture. Preferably, the seaming of a belt should be accomplished in such a manner as to avoid any substantial transverse ridge. The spacing along a track between adjacent belt apertures 12 involves, among other factors, a practical diameter for each aperture 12. In the example of aperture spacing given above, a suitable value of aperture diameter is about .052″, thus making each aperture diameter a bit less than the spacing between the peripheries of adjacent apertures.

Because of the compactness of the control track resive mehcanism, each control track 11 can be separated from an adjacent control track by a comparatively short distance. As an example, a pair of adjacent control tracks can be seprated by a distance of 5⁄16″ between track centers and provide adequate room for the individual track responsive means making up the load operating from the record belt. A belt may easily have six or seven control tracks without rendering the program belt excessively wide.

There can be any desired number of parallel program tracks and it is not necessary that a track have regularly spaced control apertures. It may be desirable to have an auxiliary control track 13 having control apertures spaced, in this example, at two minute intervals (or any other desired interval) and also have each aperture **13*a* of control track 12 staggered along the length of the control track with respect to apertures 12 in control tracks 11. Thus, in the example here, auxiliary control track 13 has its apertures 13*a* out of phase with respect to apertures 12 in control tracks 11 by one-half a minute. The belt is driven by sprocket pins operating in sprocket holes in belt tracks 14 and 15**.

The belt material itself in its most desirable form must meet severe requirements. First, it must be light and strong. Other characteristics that are essential are good dimensional stability with respect to ambient conditions (this includes room temperature as well as humidity), good tear resistance, freedom from notch sensitivity (this refers to the characteristic of a small tear or notch at an edge spreading), non-elastomeric but having a small but essential stretch and amount of plastic memory and recovery. In addition to the above characteristics, the belt material for long useful life is preferably free of plasticizers usually present in many plastics. Such plasticizers have the undesirable characteristic of migrating to the surface of a plastic and rendering the body of the plastic generally brittle, this characteristic being known as ageing. Since the belt material should be substantially non-elastomeric, such material in bulk form is generally rigid. For practical purposes, the belt preferably has a thickness of the order of about .003″, though some variation above or below this figure can be tolerated.

Of the belt materials readily available which will satisfy the above requirements, two plastics in sheet form are preferred. One is a polyethylene terephthalate plastic sold under the trade name of Mylar by E. I. du Pont of Wilmington, Del. The other material is a polyvinylfluoride avilable on the market under the trade name Tedlar, also from Du Pont. These two plastics are particularly desirable because they have the characteristics required for optimum belt quality. It is understood, however, that other materials may be used where lower standards of quality may be satisfactory. However, for program belts subject to constant usage, frequent changes in program, long life and a certain amount of abuse, as is true in school systems and various industrial operations, the materials identified above are excellent.

Belt 10 has printed thereon time designations which may be at five minute intervals or any other desired time interval. Inasmuch as belt 10, in the particular example illustarted, is for 24 hours, the indications useful on the belt are those relating to hours and minutes and possibly indications such as morning (a.m.) or afternoon (p.m.) or night time. Insofar as track 13 is concerned, certain apertures 13*a* for a school system may be 2½ minutes ahead of the hour (as, for example, 2½ minutes before 5:00 o'clock p.m.), this same arrangement being true for other hours.

Provided for insertion into or removal from any selected apertures in tracks 11 and 13 are program pins 20. These pins are preferably of a suitable material, as aluminum, steel or plastic. Each pin includes shank 21 which is here shown as having a generally cylindrical shape whose diameter is a bit larger than any of the apertures in tracks 11 and 13 as, for example, about .070″. At its outer end, shank 20 is provided with dome-shaped head 22, which is hemispherical, having the shank diameter. Shank 21 of pin 20 has reduced neck 23 whose diameter below the bevel is a bit larger (.061″) than diameter of the belt aperture. The length of neck 223 is about .007″, about half being the bevel portion and half the portion within a belt aperture. Neck 23 merges into flange or head 25. The diameter of flange 25 is larger than the diameter of the belt aperture containing the pin and the maximum diameter of head 25 is preferably no greater than the distance between centers of adjacent apertures. This permits having pins in two apertures next to each other in the same track. A flange diameter of about .100″ to .125″ can be used. The thickness of flange 25 of a pin is greater than the thickness of belt 10 and, as an example, may be about .015″. The exact thickness of flange 25 is not important except that the material should be thick enough so that it has some stiffness. The length of neck 23 is proportioned so that when pin 20 is forced into position as illustrated in the drawing, tough plastic will snugly fit about the neck and maintain the pin in the position illustrated.

Any pin 20 may be readily removed from an aperture in belt 10 by forcing the shank through a belt aperture. A pin disposed in the belt aperture will have such small flange diameter that a sprocket drum 30 of suitable size such as, for example, about 2 or 3 inches in diameter will have its cylindrical surface of a large enough curvature to accommodate flat flanges 25 without the necessity for matching drum curvature. Sprocket drum 30 may be of conventional construction and will have sprocket teeth for engaging the sprocket holes in program belt 10 along tracks 14 and 15. Belt 10 can be disposed about a number of rollers or pulleys 31 having side flanges and grooved center part for clearing pins 20. At least one pulley may be spring biased to maintain belt 10 in tension and accommodate a long length of belt.

Belt drum 30 is driven from minute hand shaft 35 which obtains its power through gear 36 rigidly attached to minute shaft 35. Gear 36 is driven by pinion 37 on shaft 38 which is driven at suitable speed from gear train generally indicated by 40. It is understood that minute shaft 35 makes one revolution per hour corresponding to the minute hand of a clock and that drum 30 driving belt 10 also makes one complete revolution per hour.

Gear train 40 is provided with one of two alternative drives. One drive to gear train 40 is from electric clock motor 41 going through one way drive 42 to the input gear train 40. Motor 41 is a conventional synchronous AC motor of suitable power and energized from an AC power line, usually 60 cycles. One way drive 42 is any one of a number of well-known mechanisms for permitting power to go from motor 41 toward gear train 40 but not in reverse direction.

In addition to the electric clock motor drive, the alternative mechanical drive includes clock spring 45 feeding power to differential 46 and thence through a clock escapement mechanism 47. Escapement 47 may be of the pendulum type or the balance wheel type, preferably the pendulum type, and is provided with electrically actuated locking means for locking the escapement against movement so long as the AC power line is alive. The power output from clock escapement 47 goes through one way drive 48 and thence to gear train 40.

The mechanical clock system has means for automatically re-winding spring motor 45 after mechanical clock operation, this re-wind being effective upon resumption of power in the AC supply line. This automatic re-wind includes electric motor 51 whose output goes to clock spring 45 in the proper direction for re-wind and also goes through differential 46 to rotary control switch 53. Control 53 comprises a simple disc having pin 54 for maintaining electric switch 55 in the motor circuit open when the clock spring is fully wound. In the event that clock spring 45 unwinds during mechanical clock operation, part of the output of differential 46 will go to turning disc 53 from its normal position to permit switch 55 to close. As long as the AC line is dead, clock spring 45, in unwinding, will simply turn switch control disc 53. Disc 53 is so arranged that travel of this disc is in the range of unwinding possible for clock spring 45. When power is available in the AC line, the electric lock on the clock escapement 47 prevents further mechanical clock operation and electric motor 51 will rewind clock spring 45. When that occurs, electric clock motor 41 will also become energized. It is evident, therefore, that within the limits of the time range of clock actuation from clock spring 45, the entire system will permit belt drum 30 to continue operation with or without a live AC line.

Referring back to belt drum 30, this drum rotates smoothly at the rate of speed corresponding to one revolution per hour. Cooperating with the portion of belt 10 disposed around drum 30 is a load generally indicated by 60 and described in detail later. Load 60 is actuated by pins in belt 10. Because of the construction of the pins, it is clear that cylindrical drum 30 will provide a bracing action on flanges 25 of each pin carried by belt 10. The lateral extent of flange 25 is great enough so that with some belt tension, pin 20 will be supported on the drum surface firmly in radial position and will be braced against lateral force of the load when a pin comes toward and then moves away from the load application point.

While the load on a program belt may assume a variety of forms, an electric switch array is convenient and through the medium of relays makes possible the control of large amounts of power by pins on belt 10. However, as has been previously indicated, there may be long periods of time, such as a day or parts of a day, when load control by belt is not desired. This is accomplished by providing calendar drum 62 which cooperates with load 60 to prevent the load from being actuated by pins in belt 10. The details of this construction will be described later but at this point it may be noted that the calendar drum can selectively control any or all of tracks 11 and 13. Calendar drum control 62 is adapted to operate once every 12 hours or any other long period of time. Accordingly, the calendar drum is driven from a mechanism which is illustrated here for providing an intermittent motion to turn a calendar drum through a desired part of a complete turn at accurately spaced time intervals.

Generally speaking, the calendar drum drive is from two separate cams which co-act to control one member for advancing the calendar drum. One such cam turns once every 12 hours (or every 24 hours as desired) while the other such cam turns once an hour. The arrangement is such that the slow turning cam (corresponding for example, to the hour hand) carries the major portion of the physical load in connection with storing energy for securing the calendar drum advance. The other cam which, in this instance, would be the minute hand cam, provides the accurate time control for triggering the calendar drum advance.

As has been generally stated, means are provided for substantially relieving the frictional loads created by fingers or actuating members for operating electric switch gear (or other devices) bearing upon cam surfaces or upon program belt pins. In general, such relieving means generally designated as contact unloading means, indicated by 63, comprises one or more electro-magnetic devices such as solenoids for maintaining such contact loads against normal spring bias for relieving the load. The electro-magnetic means are energized from the same AC power line as the other mechanism previously described and when energized will maintain the contact loads against the spring bias toward unloading. As indicated generally, the control action of unloading means 63 is directed to a pair of cam responsive electric switches to be described later and also to the switch gear generally indicated by 60.

*Calendar drum drive*

The detailed mechanism for providing a two speed type of calendar drum advance will now be described. Referring back to minute shaft 35, this shaft has rigidly attached thereto pinion 65 which meshes with gear 66 carried by jack shaft 67 having pinion 68 secured thereon. Pinion 68 meshes with hour gear 70, the gears and pinions 65, 66, 68 and 70 all cooperating to effect a speed reduction for rotating gear 70 once every twelve hours (or every twenty-four hours if desired). For convenience in indicating time, minute shaft 35 is provided with minute hand 71 while sleeve or hours tube 72 upon which hour gear 70 is secured is provided with hour indicating hand 74. Minute shaft 35 can turn freely within hour tube 72. Hands 71 and 74 may operate in conjunction with a conventional clock face carrying hour indications. Such hour indications may be on a twelve hour time basis or on a twenty-four hour time basis as desired. For convenience, arrows showing the direction of rotation of certain parts are provided as an aid to understanding of the operation.

Referring now to hour gear 70, this carries laterally extending tongue **70*a* punched out therefrom, such a tongue construction being common in the clock art. Slidably disposed in a suitable aperture through rockable lever 77, movable about pivot point 78, is pin 80 which is parallel to and laterally offset from hour tube 72. Pin 80 has flat undercut portion 80*a* which extends toward gear 36. Pin 80 is maintained firmly against turning and is biased toward the adjacent face of hour gear 70 by spring clip 82 attached to the side of lever 77. Spring clip 82 is preferably of hard steel or Phosphor-bronze and is adapted to bite into pin 80. Lever 77 and pin 80 that it supports are so proportioned and moved that when hour gear 70 and tongue 70*a* are to move the calendar drum, pin 80 has been laterally positioned to place the end of pin 80 in the orbit of tongue 70*a*** by the following means.

Hour tube 72 carries rigidly coupled thereto hour calendar control cam 84 having a generally spiral-shaped cam edge provided with cam drop **84*a*. Considering the direction of rotation of hour cam 84, the radius of the cam edge beginning with the bottom of drop 84*a* gradually increases to a maximum until the top of drop 84*a* is reached. Hour cam 84 is located on hour tube 72 just beyond lever 77 on the side away from hour gear 70. The range of radius of cam 84 from minimum to maximum is such that pin 80 can ride the edge of cam 84. The angular orientation of tongue 70*a* and cam drop 84*a* is such that tongue 70*a* will begin to exert and continue to exert longitudinal force on pin 80 in the direction away from hour gear 70 for a short time prior to, during and following the passage of cam drop 84*a* (and cam edge 86*b* to be described) past pin 80**.

Rigidly secured to minute shaft 35 is minute calendar control cam 86 which has a generally uniform radius a bit less than the maximum radius of hour control cam 84 at the top of drop **84*a*. Minute control cam 86 has laterally disposed tongue 86*a* extending toward gear 36. Tongue 86*a* is shaped so that radial edge 86*b* of cam 86 leads this tongue. The orientation of minute cam edge 86*b* is such that it follows hour cam edge 84*a*. The lateral displacement of tongue 86*a* is such that edge 86*b* permits reduced portion 80*a* of pin 80 to move longitudinally toward pinion 36 (this occurring after pin 80 is past hour cam drop 84*a*). Further rotation of hour gear 70 will permit tongue 70*a* to clear the end of pin 80 and permit spring clip 82 to move pin 80 to its normal position adjacent the flat face of hour gear 70. Lever 77 is biased by spring 90 to move pin 80 toward hour tube 72**.

Assuming that tongue **70*a* is past the end of pin 80, as hour calendar cam 84 rotates, the increasing radius of the cam edge forces pin 80 laterally away from hour tube 72 against the bias of spring 90. Since hour calendar cam 84 moves slowly, due to the gear ratio, the force that can be applied to move pin 80 laterally can be substantial and is stored in spring 90. Just before drop 84*a* of the hour cam passes pin 80, pin 80 will have been moved to its furthest outward position away from tube 72, this position being somewhat beyond the edge of minute cam 86. Hence, when drop 84*a* releases pin 80, the pin can drop on the edge of cam 86. Tongue 70*a* tends to push pin 80 so that the end of the pin is over the edge of cam 86 and pin 80 will be restrained only by the edge of cam 86. The flat undercut face of part 80*a* can cooperate with the straight edge 86*b* of cam 86 for accurate control and can cooperate with straight drop 84*a* of cam 84 also for accuracy. Leaving pin 80** round for its entire length may impair accuracy of cam action.

Edge **86*b* of minute cam 86 must be oriented to drop undercut part 80*a* of pin 80 a short time (say several minutes) after cam drop 84*a* of hour cam 84 has passed pin 80. The passage of edge 86*b* past the undercutting of pin 80 can be timed quite accurately to within a fraction of a minute since cam 86 makes a complete turn in one hour. Thus, the full friction load on minute cam 86 of pin 80 will be applied for a short time, of the order of several minutes, with the major porton of the frictional load and the force for storing energy in spring cam 90 when moving pin 80 laterally away from tube 72 being applied by hour cam 84. The orientation of tongue 70*a* on hour gear 70 should be such that tongue 70*a* passes the end of pin 80 a short time after undercut part 80*a* of pin 80 has dropped at edge 86*b*. The angular extent of tongue 86*a* can be great enough (say 60–90°) so that hour gear tongue 70*a* can move past the end of pin 80 about four or five minutes later, thus eliminating great accuracy in the length of tongue 70*a*. When tongue 70*a* releases pin 80, spring clip 82 will move pin 80 toward gear 70**.

The actual advance of the calendar drum is obtained by lever 77 in the following manner. The top end of lever 77 carries pawl 92 cooperating with ratchet 93. Ratchet 93 is prevented from over-running by spring brake 95 bearing against a tooth of ratchet 93. The dimensions and proportions of lever 77 with respect to pivot point 78 and the two arms extending above and below this pivot point are such that pawl 92 will be moved slowly along the slope of a ratchet tooth to a point just beyond the tip of the tooth and permit the pawl to drop down the driving face of a ratchet tooth and then, when lever 77 is snapped to the position where pin 80 moves quickly toward hour tube 72, the pawl will quickly drive ratchet 93 in the direction indicated through an angle corresponding to a ratchet tooth. Ratchet gear 93 drives shaft 96 and this shaft turns a calendar drum.

*Belt load means and calendar drum*

Pins 20 on program belt 10 cooperate with a load head carrying various devices to be actuated by the pins. These devices may be instruments but are preferably electric switches. The electric switches controlled by the program belt pins can be pre-fabricated switches available on the market disposed in individual housings and removable or replaceable as desired as separate units. Examples of such switches are the so-called micro-switches which are disposed in small plastic housings having dimensions of the order of about 1" x ½" x about ⅜" in width. These switches are provided with one or more mounting apertures for accommodating support rods or bolts. Such switches can handle sufficient electric power to directly, or indirectly through relays, control desired loads. Such switches include a pin or lever movable over a range for switch operation. The switch operating means, as pin, lever, etc. is biased to a normal position. The operation of the mechanism to be described makes use of the bias in such switch. It is understood, however, that the mechanism to be described can have its own bias.

The head for carrying the groups of levers and electric switches is arranged so that a control track for a program belt will have its own individual lever group and switch. The calendar drum has control portions so that each track may be disabled from control action. Inasmuch as all the tracks are similarly equipped insofar as a lever group therefor is concerned, it is only necessary to describe in detail the lever equipment for one track.

Referring now to FIGS. 6 to 12 inclusive, two support rods 100 and 101 parallel to and laterally offset from the axis of calendar drum 30 are provided. A lever group for one belt track includes floating arm 105 extending from rod 100 about which it can rock toward opposing rod 101 and terminating in slotted portion 106. Floating arm 105 has its thickness parallel to the axis of rod 100 and has slotted end portion 106 adapted to rest in annular slot 107 in guide rod 108 disposed midway between rods 100 and 101 and parallel thereto. Slotted end portion 106 is deep enough so that supported end portion 105*a* of floating arm 105 can rock about the axis of support rod 100 over a small angle such as about 15° or 20°. The actual extent of this angle of rock is not important and the purpose of this will be apparent later. Slotted end portion 106 of floating arm 105 has its top part 110 suitably shaped to cooperate with tabs in calendar drum 112. Calendar drum 112 is secured to shaft 96 which, as previously pointed out, is driven intermittently by ratchet gear 93. Calendar drum 112 is long enough to extend across all of the tracks of program belt 10 and carries indicator plate 112*a* to show the day of the week which is being accommodated. The calendar drum surface is provided with a plurality of longitudinal slots 113 and tab locating recesses 114. Recesses 114 are spaced to define a control track on program belt 10. Slots 113 accommodate metal tabs 116 which can be inserted to cooperate with any desired program belt track at any desired calendar drum position. Tabs 116 are each provided with locating fingers 116*a* which cooperate with recesses 114 to locate each tab correctly with reference to a belt track.

For a school system, a calendar drum may have fourteen longitudinal slots disposed at equal angular distances around the calendar drum cylinder. Assuming that a program belt is long enough for one week of scheduling, then calendar drum 112 can be advanced by ratchet gear 93 once every twelve hours over a week. As has been previously pointed out, calendar drum 112 remains in a fixed position for most of the time, except for a short period of time (a matter of a fraction of a second) when it is suddenly moved to a succeeding position. The calendar drum over-ride control is exercised through the presence or absence of tabs 116 for any desired belt track. With the mechanism to be described, the absence of a tab 116 just above part 110 of floating arm 105 will result in a program belt control track and the program pins in such track losing control over the corresponding electric switch. As will be explained, the presence of a tab 116 above portion 110 of a floating arm 105 prevents slotted portion 106 from rising substantially and thus permits an electric switch for the particular control track to be operated by pins in the program belt.

Floating arm 105 carries sleeve 118 through which support rod 100 passes. Thus support rod 100 provides a fixed fulcrum axis about which floating arm 105 may turn through a limited angle as hereinbefore set forth. Floating arm 105 has crank portion 119 beyond and somewhat below the axis of sleeve 118. Carried by crank portion 119 is floating pivot pin 120 which is beyond (away from arm 105) and below the axis of sleeve 118. In effect, floating arm 105 and crank portion 119 constitute a bell crank. Pivoted over floating pin 120 is an auxiliary bell crank having arm 122 and finger 123. Arm 122 has threaded through the end thereof adjusting screw 125. Arm 122 with adjusting screw 125 cooperate with lever 126 which is normally disposed below arm 122. Lever 126 has apertured ears 127 for mounting over floating pin 120, ears 127 being disposed on opposite ends of sleeve 121. Arm 122 and lever 126 cooperate to permit relative adjustment with respect to pin 120 of the angle between the two. When assembled, arm 122 is over lever 126 and between flanges 128 and 129 thereof and all of these are below sleeve 118. Floating arm 105 and lever 126 extend generally in the same direction.

To utilize space efficiently, it is preferred to have a lever and switch group so far described disposed alternately on support rods 100 and 101 as shown in FIGS. 7 and 8. This makes it possible to provide each program belt control track with its own individual lever group and electric switch and still provide sufficient room without requiring wide control tracks for the program belt. Thus such a system of alternate assemblies from rods 100 and 101 respectively toward each other makes possible a compact grouping of parts while permitting relatively narrow program belt control tracks.

To provide that a pin on a belt will always approach a lever group from the same direction, irrespective of whether the lever group extends from rod 100 or rod 101, it is preferred to have a belt pin engaging arm for each program belt track, extending from one direction only and always meeting the program belt pins in one direction. To this end, each program track lever group includes pin engaging arm 132 pivotally carried on fixed rod 133 below rods 100 and 101. Each arm 132 is provided with rounded head portion 134 for engaging the bottom face of lever 126 and with finger 136 shaped to be raised by a pin in the desired track of a program belt.

Each program track lever group is provided with individual electric switch 140. The switches are mounted on rods 141 and 142 or 141' and 142' depending upon the side of the head involved. Switch 140 has pin 143 spring biased to an outward position for movement along the axis of pin 143. Pin 143 in a particular switch is secured within the housing of the switch and operates one or more electric switches within the housing. Sometimes a rocking lever for switch operation is carried by the housing. As a rule, the actual tripping of the switch in housing 140 occurs at a particular part of the travel range of pin 143. The lever group for a switch permits adjustment by screw 125 to insure that a small elevation of finger 136 will result in switch operation as a pin on a belt passes below finger 136.

The arrangement of a switch 140 with reference to finger 123 is such that when arm 132 and lever 126 are disposed above the program belt, finger 123 engages switch pin 143. Assuming that floating arm 105 is kept down with slotted part 106 substantially against rod 108, the various parts of a lever group for one belt track can be adjusted by screw 125 so that switch pin 143 is actuated when arm 132 is raised by a program pin carried by belt 10.

When the bell crank arrangement including finger 123 as one crank arm and parts 122 and 126 as the other crank arm, is rocked by a program belt pin acting on finger 136, then switch 140 must be operated if floating pin 120 remains stationary. This is generally true if floating arm 105 is prevented from rocking by calendar drum tab 116 acting against part 110 of floating arm 105. If tab 116 on the calendar drum is not present, and if the load presented to crank finger 123 by switch 140 is sufficient, then switch pin 143 acts as a fixed fulcrum. This permits floating arm 105 to rock, slotted portion 106 rising above rod 108 and floating pin 120 dropping. Switch pin 143 remains substantially in its normal position. Rod 150 is provided to limit the rocking of floating arm 105.

To prevent binding in slot 107 of slotted part 106 by floating arm 105, it is preferred to have slotted part 106 free to move upwardly a little above rod 108 when calendar drum tab 116 is supposed to hold part 106 down. For example, a clearance between portion 110 of floating arm 105 and the outer edge of calendar drum tab 116 of about 1/32″ can be tolerated. In the absence of tab 116, floating arm 105 can raise portion 106 about 1/4″.

The program belt pins essentially actuate one end of one bell crank, whose other end controls a switch and whose pivot is at one end of a second bell crank having a fixed pivot axis and whose other end is free or not, as desired. The first bell crank must have its other end cooperate with the switch to permit said switch to function as a possible fulcrum. Thus in the lever arrangement described, the first bell crank is a lever system so that parts 132; 126 and 122 form one crank arm pivoted on floating pin 120. The first bell crank has its other crank arm as finger 123 operating switch 140. Floating pin 120 is at the end of crank arm 119 pivoted on fixed pivot rod 100 (or 101 depending upon the lever group). Crank arm 119 and arm 105 form a second bell crank whose free end 106 floats or is restrained, depending upon the absence or presence of a calendar drum tab 116. The load presented to crank arm 123 must be such that if end 106 of arm 105 is not restrained, then the first bell crank essentially operates as a unit about the switch pin as a fulcrum and pin 120 dropping enough to permit end 106 to rise. If part 106 is restrained, then pin 120 is fixed and finger 123 provides true bell crank action.

The first bell crank arrangement can be replaced by a lever so that finger 123 would be in line with lever 126 (or 122 or 132 in a simplified version). This would require relocation of switch 140 and would also be less compact. Also arm 105 can be disposed to be an extension of crank arm 119. This would necessitate relocating the calendar drum.

*Auxiliary clock pendulum locking means*

Figures 1, 2, 3:
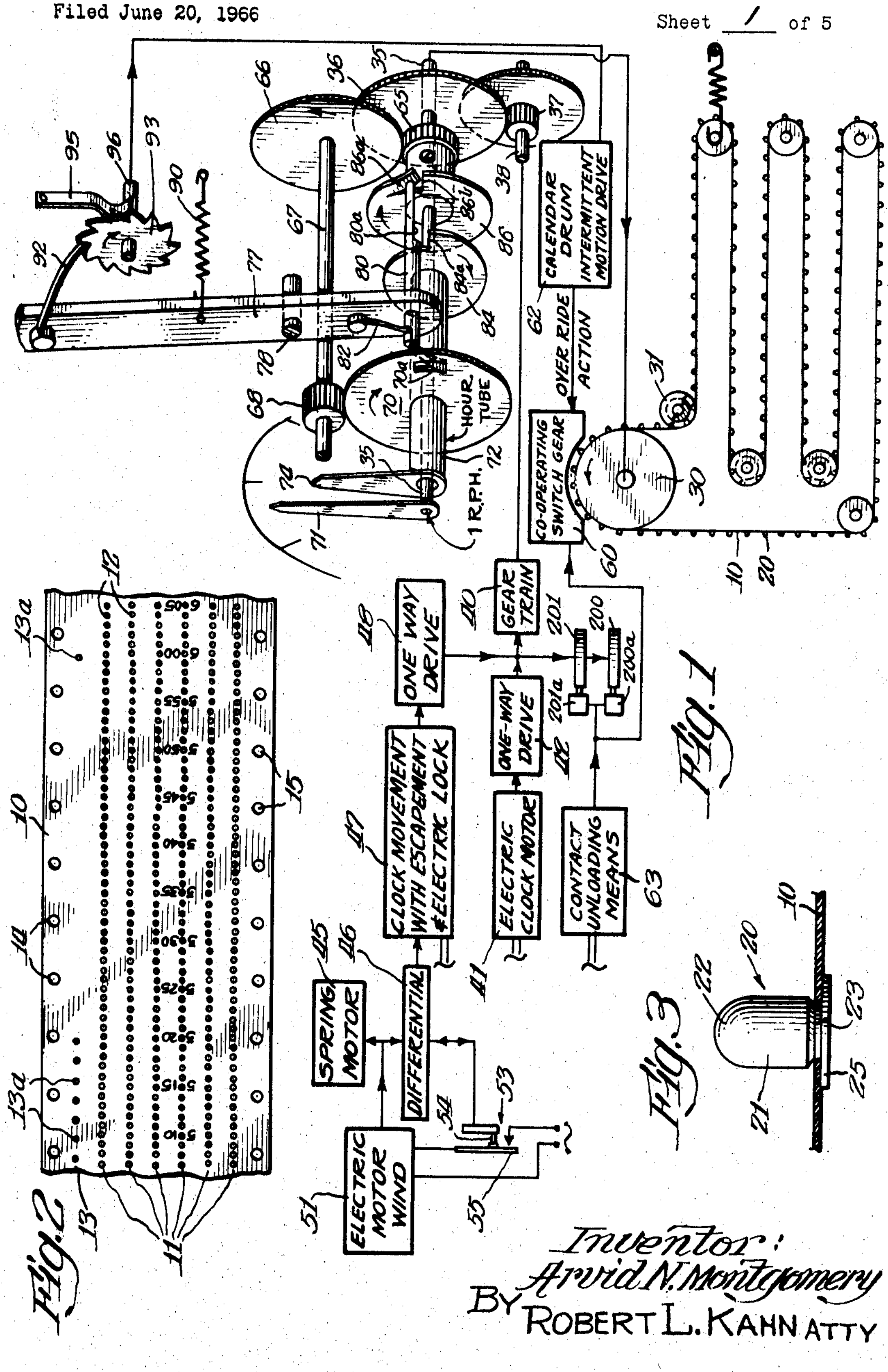
FIG. 1 is a diagrammatic illustration of a system embodying the present invention, a certain part of this figure showing the structural details of the cam control for calendar drum drive.
FIG. 2 is a plan view of a length of program belt used in the present invention.
FIG. 3 is a side view on a magnified scale of a program pin in a program belt.

Referring now to FIGS. 4 to 6 inclusive, there is illustrated the specific means (symbolically included as block 47 of FIG. 1) for locking the pendulum in the auxiliary clock movement against oscillation while the power supply circuit is live. The pendulum for the auxiliary clock consists of a pendulum rod 160 at the bottom end of which there is disposed weight 161. In accordance with usual practice, weight 161 is threadedly secured to rod 160 and can be adjusted along the rod to control the pendulum length and frequency of oscillation. Pendulum rod 160 is pivotally secured in block 163 from which spring wire 164 continues up and has bent end 164*a*. Block 163 carries escapement tines 167 and 168. Tines 167 and 168 cooperate with escapement ratchet gear 170, secured to shaft 171 going to gear 172 forming part of the gear train in block 47 of the auxiliary clock system. As is well-known in the clock art, tines 167 and 168 cooperate with ratchet gear 170 to control the unwinding of spring 45 through a gear train for conventional clock action. Inasmuch as such clock movements are old, no description thereof is deemed necessary.

Tines 167 and 168 are so dimensioned and proportioned that when pendulum 160 oscillates, each tine will alternately engage a tooth of escapement ratchet 170 and permit the escapement ratchet gear to turn clockwise in this particular showing. It is understood that the spread between tines 167 and 168 must be such that when one tine releases an escapement tooth, the other tine engages a tooth which is advancing into proper position. No attempt is made to show the precise relation between teeth and tines in the present showing of an escapement for the reason that the details of the escapement tines and ratchet are not new. It is obvious that the amplitude of oscillation of pendulum rod 160 must be sufficient to accomplish the escapement action.

The function of spring wire extension 164 is to take up the shock in connection with the application of locking means to the pendulum when electric power comes on, after interruption. The free end of pendulum rod wire extension 164 has disposed above it, unloading bar 175 whose lower edge 176 is shaped to provide a sloping surface as illustrated. Unloading bar 175 normally has its length generally vertical and sloping edge 176 at the bottom makes an angle of about 45° to the vertical. Unloading bar 175 is movable generally vertically along the length between the locking position illustrated in FIG. 5, when the power circuits are alive, and the unlocking position shown in FIG. 5A, when the power circuits are dead and the auxiliary clock is operating. As illustrated in these two figures, unloading bar 175 is normally in the down position where sloping edge 176 can engage bent end 164*a* of wire 164. Due to the action of sloping edge 176 pendulum rod 160 will be moved so that weight 161 is at the left end of its travel range as illustrated in FIG. 5. When unloading bar 175 is moved down from the power outage position illustrated in FIG. 5A, no matter what position pendulum rod 160 is in, the engagement of what is effectively cam edge 176 will result in locking the pendulum rod to the position previously described. Wire 164 must be stiff enough to perform the pendulum positioning.

Unloading bar 175 has top end portion 178 pivotally secured to crank arm 179 which is adjustably secured to shaft 180. Shaft 180 has crank arm 181 secured thereto and biased by spring 182 to the right as illustrated in FIGS. 5 and 5A. Cranks 179 and 181 function as a bell crank, whose angular relation may be adjusted. Crank arm 181 has pivotally secured thereto link 185 which has end 186 as the armature of a solenoid diagrammatically illustrated as 188. The winding of this solenoid is connected to the alternating current power supply line. By virtue of the mechanical arrangement illustrated in FIGS. 5 and 5A and to be additionally described, only one solenoid is necessary for unloading the various electrical contacts and locking the pendulum. It is understood that shaft 180 and link 185 will be suitably supported in the housing for the entire system. Unlocking bar 175 may require guides along the sides to prevent bar 175 from swinging excessively about the pivot at end portion 178. Unlocking bar 175 should be wide enough so that the bent end 164*a* of wire 164 will never lie beyond the sides of bar 175.

Unlocking bar 175 is provided with laterally extending long pin 190. Unlocking bar 175 is so disposed within the housing of the entire apparatus that every finger 132 of all the lever groups above the belt drum can rest upon pin 190. When the system is in normal operating position with electric power available, support pin 190 will be below the free and of lever 132 and permit such lever 132 to ride upon belt 10 or be raised by any of the program pins in belt 10. This position is illustrated in FIG. 5. When the power system is dead, unlocking bar 175 is raised by spring 182 as illustrated in FIG. 5A so that pin 190 can elevate all fingers 132 of the entire array of fingers to clear the belt drum and belt pins. In connection with such elevation of pin 190, care should be taken so that the elevation of all levers 132 should not be excessive and cause arms 105 and portions 106 thereof to jam against the calendar drum tabs. The elevation of levers 132 as illustrated in FIG. 5A has been exaggerated for purposes of illustration. In practice, the elevation of levers 132 by pin 190 should be just enough to permit fingers 136, which would normally be engaged by a belt program pin, to clear such pin. When a power failure occurs and levers 132 and fingers 136 are clear of belt 10 and pins 20, and if the power failure lasts long enough, it is possible that calendar drum 112 may be snapped from one position to its next position. Such calendar drum movement may cause one or more tabs 116 to move into such a position with respect to parts 110 of each arm 105 as to cause such arm or arms to move up or down or not move at all. This will depend upon whether a tab 116 has been above part 110 and is followed by an empty slot without a tab or vice versa or is followed by another tab. If arm 105 is moved downwardly from the position illustrated in FIG. 9, then switch 140 for that particular belt track will be operated. This switch action will be idle since the power system is dead. However, the downward movement of arm 105 coupled with the upward position of finger 136 is equivalent to a belt pin operating switch 140. Due to the lever ratios involved, the fact that finger 136 is raised slightly above any position resulting from the presence of a belt pin would not cause any damage. As a rule, most spring biased switches or any switches having a spring action for opening or closing contacts generally permit some over-travel so that any slight elevation of finger 136 above that caused by a pin would be accommodated by the mechanism.

Conversely, if the calendar drum happened to turn so that part 110 of one or more arms 105 could move upwardly because of the absence of one or more calendar tabs 116 in the proper position, then switch 140 would return to normal position. Again this would accomplish nothing since the power circuits would still be dead.

Insofar as normal operation is concerned, when the electric power system is alive, the possibility of calendar drum 112 being turned while a belt program pin is directly underneath any finger 136 can be rendered highly improbable. For example in the system described, a belt pin 20 may start to raise a finger 136 about 15 or 20 seconds at the most before zero time (which may be on the minute for tracks 11 or on a half minute for belt track 13) and may drop finger 136 about 15 or 20 seconds after zero time. During this 30 to 40 second interval, switch 140 operated by finger 136 may actually be operated to an off-normal position for say plus and minus ten seconds with respect to zero time. However, as will be described later, switch 140 would normally be in series with an accurately controlled auxiliary switch timed to the second and in off-normal position for a predetermined short time such as say three seconds. Thus this last named auxiliary switch could be in off-normal position at minus 1.5 seconds through zero time to plus 1.5 seconds. During this short time, which is here indicated as three seconds by way of example, the circuits going through any switches 140 would be live.

Insofar as the calendar drum advance is concerned, this can also be timed to within several seconds and the calendar drum advance may be set to occur during the time between minus ten seconds to minus 1.5 seconds or between plus 1.5 seconds and plus 10 seconds with reference to zero time. The zero time in the calendar drum advance would be usually at a predetermined hour at the proper times when calendar drum advance is to occur. This may be at 6:00 a.m. and6:00 p.m. for each day in the case of a school system. It is possible to arrange program pins on belt 10 so that when a calendar drum advance is set to occur, there will be no program pins plus and minus one minute. However, even if there are program pins, it is possible to arrange the relative times when a calendar drum advances with respect to exactly when power circuits are alive so that when the calendar drum advances, there will be no effect upon any switch 140. In connection with belt track 13, it must be remembered that the apertures in this track are staggered by one-half minute with respect to the apertures in tracks 11. Accordingly, the time scheduling given above will generally do for track 13. It is preferred to arrange for calendar drum advance at an instant of time when the auxiliary switches are in normal position so that no live circuits are operated on.

Insofar as the accuracy of timing is concerned, any cam which turns once per hour or faster can easily be accurate to within ten seconds of time. As an example, a cam which turns once per hour will move through an angle of six degrees per minute. Such a cam with a diameter of the order of about 2 inches can be made so that an accuracy of ten or fifteen seconds of time can easily be obtained. In fact a two inch cam will have its edge travel at the rate of about .01" for each six seconds of time. Cams 84 and 86 may be made so that the calendar drum advance may, if necessary, be timed to within 15 seconds. Insofar as any cam turning once a minute or once every two minutes is concerned, (these would be used on the auxiliary switches) a corresponding accuracy to a fraction of a second of time may easily be obtained.

It should be noted that the shape of part 110 of each arm 105 is such that any tab 116 moved by the calendar drum would push arm 105, if it were in an up position, downwardly and jamming of parts would be avoided. Under the worst possible conditions when a power failure occurs and finger 136 for each track is raised just slightly above the level due to a program pin operating on it, the calendar drum will have its frictional load increased somewhat in connection with moving from one position to another. By having parts 110 of each arm 105 provided with a smooth polished edge and making these arms of nickel-plated steel, the frictional load presented to tabs 116, which can be of brass or any metal or plastic, may be made negligible. This frictional load may be taken care of by having spring 90 of the double cam arrangement for advancing the calendar drum strong enough so that the calendar drum will aways move to a new position even under adverse conditions as outlined above. The energy storage in spring 90 is spread over such a long period of time and the actual amount of energy required is so small that the frictional load involved in advancing the calendar drum will have no appreciable effect upon the timekeeping qualities of the system during a power failure.

Unloading bar 175 also carries pivot pin 192 upon which is pivotally secured one end of lever 193. Lever 193 is rockably secured on pivot pin 194, which pin is stationary and is supported in the frame of the entire mechanism. Lever 193 carries switch actuating pin 196 at its free end thereof for cooperation with spring arms 197. Spring arms 197 have bent ends 198 which will normally ride on edges 199 of accurate timing cams 200 and 201. Cam 200 has two cam drops 202 and **202*a* 180° apart. Cam 201 has one drop 203. Cams 200 and 201 are secured to shaft 205 which is driven at a predetermined rate such as ½ r.p.m. The drops for cams 200 and 201 may be aligned or staggered depending upon desired action. The function of each cam is to control through an auxiliary switch the precise timing for closing an electrical circuit through an auxiliary switch and one or more switches 140. Each cam drop is accurately timed with regard to onset and duration on the order of a second. As an example, the cam drop may have a duration of three or four seconds during which time a circuit through an auxiliary switch and any switch 140** in series with the auxiliary switch may be controlled. Instead of simple cams, each cam may have means to adjust the position and extent of the cam drop, such adjustable cams being old.

One auxiliary switch, as 200*a* controlled by cam 200 may be used with all switches 140 operating in belt tracks 11. The other auxiliary switch 201*a* for cam 201 can be used with a switch 140 operating in track 13 of belt 10. This track has its apertures one-half minute out of phase with the apertures for tracks 11. Hence cam 201 will have its drop timed to occur on the half minute. If these two cams turn once every two minutes, then cam 201 would operate its auxiliary switch 201*a* every two minutes on the half minute as zero time. Cam 200 has two drops and operates its auxiliary switch once every minute. It is possible to have an individual accurate timing cam for each belt track and have individual auxiliary switches for each track switch 140. In such case, each accurate timing cam could be phased as desired within the limits of the time range when any switch 140 is off-normal. For example, if track 1 has its switch 140 and auxiliary switch to close a load circuit at say minus 1.5 second to zero to plus 1.5 seconds, then track 2 can be arranged so that its load can be operated at say minus three seconds to about zero. The zero is the arbitrary instant when a minute on belt 10 is supposed to start. It is clear that within the rather generous time gate provided for off-normal positioning of any switch 140, it is possible to provide narrow (say three seconds) time gates for live circuit control by auxiliary switches and arrange the narrow gates at any desired positions within the broad time gate.

It is understood that the various parts of the mechanism so far described are supported in a suitable housing including front and rear plates 210 and 211 as illustrated in FIGS. 4 and 6. These plates are maintained in spaced relationship with respect to each other by bolts or other means. The various rods and pins upon which assemblies are disposed can be provided with suitable means for keeping such assemblies intact on such rods such as, for example, a C washer as illustrated in FIG. 12 disposed over an annular slot in pin 120.

A substantial advantage of a system embodying the present invention resides in the ease with which a different prearranged program belt may be substituted for a current belt used in a system. This can be accomplished by stripping the endless belt from the system, a spring mounting of one or more pulleys being designed to permit this. In installing a new belt, it will be necessary to align the time and day of the new belt (this being printed on the belt) with the time and day of the system, this being indicated by the position of the clock hands and the calendar drum.

Another substantial advantage resides in the possibility that any one or more tracks may advantageously use a long dwell of a finger upon the belt when a program pin is passing underneath such finger. For example, in the simplified illustration of the lever system shown in FIG. 9A, tracking arm 126' is one arm of the bell crank whose other arm 123 controls switch 140. With such an arrangement, a program belt pin 20, as it approaches the bottom of tracking arm 126' of the bell crank will raise tracking arm 126' and operate switch 140 and keep the switch in off-normal position for any desired part of the time that the tracking arm is elevated above the program belt. The exact duration of such off-normal switch action can be controlled by an adjusting screw to control when finger 123 of the first bell crank actually puts the switch in off-normal position. This could be done by having an adjusting screw between switch pin 143 and the adjacent surface of crank arm 123. Due to the lack of sharp edged finger 136 in the tracking arm in the structure illustrated in FIG. 9A there will be a gradual rise of the tracking arm and a dwell and a gradual drop. By adjusting the bell cranks or the switch pin or both so that the switch is thrown when the tracking arm has begun to rise and remains thrown until the tracking arm is not quite down to the belt after the program pin has passed, the duration of an off-normal switch condition may be increased to a period somewhat greater than a minute in the system illustrated with the dimensions as given. Such an extended program pin dwell of the switch as in FIG. 9A may be desirable with those program pins in track 13 occurring at two minute intervals and staggered by one-half minute from the belt apertures in tracks 11.

In connection with school clock systems, where the system herein disclosed can function as a master clock and will operate in conjunction with simple remote clocks, means for re-setting remote clocks periodically are generally provided. Generally a remote clock re-setting operation may require up to almost one minute or even longer where a remote clock is badly off-time. Accordingly, cam 201 may require a dwell corresponding to the amount of time generally necessary for re-setting a remote clock. This cam will have its auxiliary switch wired in series with a switch 140 controlled by track 13 of the program belt. Hence it may require the lever system illustrated in FIG. 9A to obtain a long energization of the electric circuits controlled by switch 140 for track 13 and its auxiliary switch 201*a*. Conforming to the gate principle governing the precise time for energizing the circuits controlled by tracks 11 of the program belt, it will be desirable for the long dwell of auxiliary switch 201*a* controlled by cam 201 to be somewhat shorter in time duration than the off-normal dwell of switch 140 controlled from track 13. Thus if the dwell of switch 201*a* controlled by cam 201 is 58 seconds (this being common), then the lever arrangement illustrated in FIG. 9A can be so dimensioned and adjusted that switch 140 controlled thereby for track 13 can have an off-normal position for 70 seconds as an example.

What is claimed is:

1. A programming mechanism for supervising and controlling remote devices, said programming mechanism including a flexible programming belt provided with a series of apertures and contact pins, said contact pins with a shank of uniform diameter, a domed upper end, a neck of reduced diameter, and a flat flange-like base adjacent to said neck, said neck sized for snug-fitting retention of the contact pins within the apertures of said belt, said belt constructed of synthetic resin material possessing sufficient yield, strength and resiliency to withstand without permanently deforming the stresses presented by the insertion of the shank of said contact pins in said apertures.

2. The mechanism according to claim 1 wherein said belt is in sheet form having a thickness of the order of about .003" and wherein the belt material has excellent dimensional stability with respect to ambient room conditions, is non-elastomeric, has a small but essential amount of plastic memory and recovery, has high tear strength, is substantially free of notch sensitivity and is free of inert plasticizers normally characteristic of ageing in plastic materials.

3. The mechanism according to claim 2 wherein said belt material is of the group consisting of polyethylene terephthalate and polyvinylfluoride.

4. The mechanism according to claim 1 wherein the pin flange base has a diameter of the same general order as the shank length, a rotatable drum about which said belt is disposed for driving purposes, said drum having a diameter which is large in comparison to the contact pin flange diameter so that the contact pin flange resting upon the drum surface subtends a small angle of the order of a few degrees of arc, and a load including at least one finger extending generally tangentially of said drum surface, said finger being movable by the contact pins during drum rotation for load actuation in program control, said finger action creating a force component upon the free end of the contact pin tending to rock said contact pin, said belt, said contact pin flange base and drum surface below the contact pin flange cooperating to provide excellent contact pin support while permitting positive finger movement by the contact pin, said finger movement having sufficient amplitude and force whereby the load controlled by finger movement can be rugged enough and have sufficient operating tolerances to include commercially available devices as a load.

5. The mechanism according to claim 4 wherein said load includes a device which is physically separate as an independent article of commerce, said article having a part thereof movable over a range, means mounting said article in cooperative relation to said finger for actuation control by said belt supported contact pin and means for independently adjusting the travel range of said finger with respect to said article part travel range whereby said article may be controlled by said belt supported contact pin without special adjustments of the internal parts of said article.

6. A program control system normally powered by an A.C. system, having its frequency monitored, comprising a program record belt having at least one control track along the record belt length, said record belt having, at spaced intervals along a track, control members projecting outwardly from one record belt face, a drum having a cylindrical record belt supporting surface, means supporting said record belt so that a length thereof will always be about a part of said drum for belt driving purposes with the control members extending away from the drum surface, means coupling said record belt and drum so that the drum rotation will cause belt travel, a synchronous type A.C. electric motor, a gear train having a power input and power output, one way drive means connecting said electric motor to said gear train input, means connecting the gear train output to said drum for moving said record belt at horological speed, a load head for each record belt control track, said load head including a lever actuated by the control members of a particular record belt track with the lever being rockable about a pivot axis, means supporting said load head in proximity to said drum with the lever pivot axis being parallel to and laterally offset from the drum axis and the lever cooperating with finger means in the path of travel of the control members so that said lever normally may be rocked about its pivot axis as the control members are moved with said record belt, an electric switch carried by said load head for cooperation with said lever to be operated thereby with said lever rocking movement, the load head including the switch normally creating a frictional drag of the finger on each record belt control track, an auxiliary clock movement independent, for both power and time keeping, from the A.C. power system, one way drive means coupling the auxiliary clock movement to the input of said gear train, said auxiliary clock movement being adapted to drive said drum at substantially correct time over a limited period, means responsive to power from said A.C. system for inhibiting the operation of said auxiliary clock movement, unloading means cooperating with each load head, said unloading means having an active position where the finger means of all of said load heads are maintained clear of the record belt and its projecting control members and having an inactive position where normal cooperation between the load heads and record belt occurs, means independent of said A.C. system for normally biasing said unloading system to its active position and means responsive to power from said A.C. system for overcoming said normal biasing means whereby said record belt will be driven by said auxiliary clock movement at horological speed during a power outage with said record belt being free from the drag of said finger means.

7. The system according to claim 13 wherein said auxiliary clock movement includes a pendulum type clock and an escapement, and means energized from said A.C. power system locking said pendulum to one of its two extreme positions to prevent pendulum oscillation, a power outage functioning automatically releases the pendulum for normal auxiliary clock operation.

8. The system according to claim 7 wherein said pendulum locking means includes a member having a sloping cam edge, said means energized from said A.C. power system including an electro-magnet moving said cam member so that said cam edge engages an end of said pendulum to lock said pendulum against oscillation and means moving said cam free from said pendulum locking position upon de-energization of said electromagnet due to power failure.

9. A program control system comprising a program record belt having at least one control track, said belt having control members projecting outwardly from the belt surface, a drum supporting said belt, means for driving said drum at a horological rate for moving said belt, a load head for each belt control track, said load head including a first lever means including an arm having an end portion resting above said belt control track and being movable about a floating pivot parallel to and laterally offset from the drum axis, said arm end portion movable toward and away from said belt surface in response to control members on said belt control track passing below said arm end portion, said load head including a second lever means rockable about a fixed pivot parallel to and laterally offset from the floating pivot, means coupling said floating pivot to said second lever means for moving said floating pivot in accordance with the position of said second lever means, means cooperating with said second lever means for determining the position thereof to thereby determine the position of said floating pivot, electric switch means forming part of said load head, means coupling said switch means and said first named lever means for switch operation, means biasing said switch means to a normal position, said second lever means in one position moving said floating pivot to render said first lever means effective for switch operation in response to said belt control members, said second lever means in another position moving said floating pivot to render said first lever means ineffective for switch operation even through said belt control members operate on said first lever means, whereby the program control function may temporarily be suspended.

10. The system according to claim 9 wherein said belt has a plurality of parallel control tracks, each said control track having a width of the order of about 1/4 of an inch and having its own control head and lever system, said lever system including a tracking arm, means mounting the control heads adjacent tracks alternately on opposite sides of the line across the belt control tracks where actual tracking occurs, and means mounting all of said tracking arms for pivotal movement about an axis parallel to and laterally offset from the drum axis, all of said tracking arms extending from one side of said means so that the belt travels away from the tracking end of said arm in all tracks and said lever system arrangement accommodates switches which may be wider than said belt control track.

11. The system according to claim 9 wherein the means cooperating with the second lever means includes a calendar drum, means mounting said calendar drum for turning about an axis parallel to and laterally offset from the axis of said drum, said calendar drum including removable tabs extending from the periphery thereof, there being one tab for each belt control track longitudinally of said calendar drum and there being as many tab accommodating means circumferentially of said calendar drum providing supervisory control at desired times, and means turning said calendar drum suddenly through a desired angle corresponding to the period of time to be supervised, said calendar drum remaining in fixed position except when moved.

12. The construction according to claim 11 wherein said means moving said calendar drum includes a pair of cams, means driving said cams at horological rates, one cam being driven at a slow rate and the other cam being driven at a faster rate, each of said cams having cam drops and cam followers advancing said calendar drum through a desired angle, said slow cam being adapted to provide the power for advancing said cam and the faster cam being adapted to provide timing accuracy, and means for interlocking the followers of said two cams whereby said calendar drum is moved in response to the follower action of both cams.

13. The construction according to claim 9 wherein said first lever means has a bell crank having one lever arm responsive to said bell control members and the other arm coupled to said switch means and to the rocking pivot of the second lever means.

References Cited

UNITED STATES PATENTS

| | | | |
|---|---|---|---|
| 702,808 | 6/1902 | Lyman. | |
| 2,495,462 | 1/1950 | Lassiter | 200—35 |
| 3,158,853 | 11/1964 | Coben | 200—46 |

ROBERT K. SCHAEFER, *Primary Examiner.*

H. O. JONES, *Assistant Examiner.*

U.S. Cl. X.R.

200—46; 74—3.52